United States Patent
Paya et al.

(10) Patent No.: US 9,684,898 B2
(45) Date of Patent: Jun. 20, 2017

(54) SECURING PERSONAL IDENTIFICATION NUMBERS FOR MOBILE PAYMENT APPLICATIONS BY COMBINING WITH RANDOM COMPONENTS

(71) Applicant: GOOGLE INC., Mountain View, CA (US)

(72) Inventors: Ismail Cem Paya, San Francisco, CA (US); Robert Lieh-Yuan Tsai, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 621 days.

(21) Appl. No.: 14/036,962

(22) Filed: Sep. 25, 2013

(65) Prior Publication Data

US 2014/0089196 A1 Mar. 27, 2014

Related U.S. Application Data

(60) Provisional application No. 61/705,620, filed on Sep. 25, 2012.

(51) Int. Cl.
*H04W 12/06* (2009.01)
*G06Q 20/40* (2012.01)
(Continued)

(52) U.S. Cl.
CPC ......... *G06Q 20/4012* (2013.01); *G06F 21/31* (2013.01); *G06Q 20/204* (2013.01);
(Continued)

(58) Field of Classification Search
CPC combination set(s) only.
See application file for complete search history.

(56) References Cited

U.S. PATENT DOCUMENTS 6,662,299 B1 * 12/2003 Price, III .............. G06F 21/31
 713/171
6,959,394 B1 * 10/2005 Brickell ............... G06Q 20/206
 380/44

(Continued)

FOREIGN PATENT DOCUMENTS

| JP | 2010267215 | | 11/2010 |
| KR | 1020070075391 | A1 | 7/2007 |
| WO | 2014/052474 | A1 | 4/2014 |

OTHER PUBLICATIONS

Oh, "International Search Report and Written Opinion issued in Appl. No. PCT/US2013/061719", Jan. 10, 2014, 1-12.

(Continued)

*Primary Examiner* — Taghi Arani
*Assistant Examiner* — Phy Anh Vu
(74) *Attorney, Agent, or Firm* — Johnson, Marcou & Isaacs, LLC

(57) ABSTRACT

Systems and methods can secure personal identification numbers associated with secure elements within mobile devices. A host application of the mobile device can receive a personal identification number (PIN) or user PIN from a user. The application can generate one or more random PIN components. The application can compute a PIN for the secure element based upon the user PIN and each of the one or more random components. The SE can be configured using the PIN computed for the secure element. Each of the one or more random components may be stored in one or more distinct, diverse locations. In addition to entering the correct user PIN, each of the one or more random components must be retrieved from the diverse locations in order to reconstruct the PIN for the secure element whenever performing a transaction using the secure element.

20 Claims, 6 Drawing Sheets

(51) Int. Cl.
*G06F 21/31* (2013.01)
*G06Q 20/20* (2012.01)
*G06Q 20/32* (2012.01)
*G06Q 20/38* (2012.01)

(52) U.S. Cl.
CPC ..... *G06Q 20/3227* (2013.01); *G06Q 20/3278* (2013.01); *G06Q 20/385* (2013.01); *G06Q 20/3821* (2013.01); *G06Q 20/3827* (2013.01); *H04W 12/06* (2013.01)

(56) References Cited

U.S. PATENT DOCUMENTS

| | | | | |
|---|---|---|---|---|
| 2002/0067832 | A1* | 6/2002 | Jablon | H04L 9/0844 380/277 |
| 2002/0071566 | A1* | 6/2002 | Kurn | H04L 63/062 380/281 |
| 2002/0097408 | A1* | 7/2002 | Chang | G06F 3/1245 358/1.6 |
| 2003/0101346 | A1* | 5/2003 | Barron | H04L 9/0827 713/175 |
| 2003/0145066 | A1* | 7/2003 | Okada | H04L 29/12009 709/219 |
| 2003/0217006 | A1* | 11/2003 | Roever | G06Q 30/06 705/50 |
| 2004/0019786 | A1* | 1/2004 | Zorn | H04L 9/3273 713/168 |
| 2004/0025027 | A1 | 2/2004 | Balard et al. | |
| 2004/0030932 | A1* | 2/2004 | Juels | H04L 63/083 713/151 |
| 2004/0100363 | A1* | 5/2004 | Lane | G06K 19/025 340/5.86 |
| 2006/0184788 | A1* | 8/2006 | Sandhu | H04L 63/0442 713/159 |
| 2007/0033419 | A1* | 2/2007 | Kocher | G06F 21/10 713/193 |
| 2007/0125847 | A1 | 6/2007 | Millett et al. | |
| 2008/0172730 | A1* | 7/2008 | Sandhu | H04L 63/06 726/9 |
| 2009/0034725 | A1* | 2/2009 | Davies, Sr. | H04L 63/08 380/255 |
| 2009/0055906 | A1* | 2/2009 | von Wendorff | G06F 21/79 726/5 |
| 2009/0086967 | A1 | 4/2009 | Ozawa | |
| 2011/0085201 | A1* | 4/2011 | Sakuraba | G06F 3/1204 358/1.15 |
| 2011/0225638 | A1 | 9/2011 | Nahari | |
| 2011/0246766 | A1* | 10/2011 | Orsini | G06F 11/1076 713/160 |
| 2012/0276924 | A1* | 11/2012 | Li | G06F 21/88 455/456.2 |
| 2015/0256973 | A1* | 9/2015 | Raounak | H04L 67/22 726/7 |

OTHER PUBLICATIONS

Becamel, "International Preliminary Report on Patentability issued in International Application No. PCT/US2013/061719", mailed on Apr. 9, 2015, 9 pages.

Horat, "Extended European Search Report issued in European Application No. 13840451.2", mailed on Apr. 11, 2016, 9 pages.

Horat, "European Office Action issued in European Application No. 13840451.2", mailed on Dec. 1, 2016, 9 pages.

* cited by examiner

SECURING PERSONAL IDENTIFICATION NUMBERS FOR MOBILE PAYMENT APPLICATIONS BY COMBINING WITH RANDOM COMPONENTS

RELATED APPLICATION

This patent application claims priority under 35 U.S.C. §119 to U.S. Patent Application No. 61/705,620, filed Sep. 25, 2012 and entitled "Securing Personal Identification Numbers for Mobile Payment Applications by Combining with Random Components." The entire contents of the above-identified application are hereby fully incorporated herein by reference.

TECHNICAL FIELD

The present disclosure relates to systems and methods for securing personal identification numbers used for mobile payment applications and, more particularly, to combining identification numbers with random components stored in diverse locations.

BACKGROUND

Transactions such as payments, other financial operations, and ticketing may be implemented using a tamper-resistant hardware device. This device is commonly referred to as a secure element. The secure element may be used for contactless transactions at a point of sale (POS). Contactless payments may occur over a wireless near field communications (NFC) channel. An applet may execute on the secure element to provide functionality for such transactions. When the secure element is embedded within a mobile computing platform such as smartphone, a higher-level application may execute on the mobile computing device. The application can interface with the applet and the secure element. For example, the user interface to the applet and thus the secure element is generally provided by the application.

A transaction or payment applet generally requires a personal identification number (PIN) to authorize a transaction. A user may set this PIN when first configuring the payment mechanism associated with the secure element. While use of a PIN is a critical security mechanism, PINs are generally quite short. Furthermore, research suggests that users generally pick relatively predictable PINs or reuse PINs that they use for other functions. For example, a user may select the same PIN for secure element access as used for a screen unlock function on the mobile device. In a system where the screen unlock PIN or codeword is less secured and easy to recover, the application on the secure element would be rendered vulnerable to compromise. There is a need in the art for leveraging the operating environment and features of a mobile device to increase security of user PINs associated with secure elements embedded within such mobile devices.

SUMMARY

In certain example embodiments described herein, methods and systems can secure personal identification numbers associated with secure elements within mobile devices. A host application of the mobile device can receive a personal identification number (PIN) or user PIN from a user. The application can generate one or more random PIN components. The application can compute a PIN for the SE based upon the user PIN and each of the one or more random components. The SE can be configured using the PIN computed for the SE. Each of the one or more random components may be stored in one or more diverse or distinct locations. In addition to entering the correct user PIN, each of the one or more random components must be retrieved from the diverse locations in order to reconstruct the PIN for the SE whenever performing a transaction using the SE.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

The embodiments described herein enable securing a PIN for mobile payments by combining the PIN entered by the user with one or more random components prior to applying the PIN to a secure element or a secure memory. By combining or obscuring with random components, the actual PIN used at the secure element can be far more complex than the user entered PIN. For example, the entropy of the PIN may be significantly increased. The actual secure element PIN may be considered a PIN that is be split into multiple shares, splits, or components including the one entered by the user as the user PIN. Each of the PIN components may be stored in diverse locations. Such locations may include the host memory of the mobile device, online storage, online services, hardware tokens, and so forth.

When a secure element PIN is needed, the user can enter the PIN and each of the additional components can be recovered from their various locations. From the user entered PIN and the retrieved components, the secure element PIN may be reconstructed. All of the PIN components are required for reconstructing the actual secure element PIN. If for any reason one of the PIN shares is lost or deleted, it would be extremely difficult to access the secure element. Even if the secure element has not been properly reset or wiped, it may still be rendered unusable by destruction of one of the PIN components. For example, one PIN component may be stored online or in the cloud. If that PIN component is destroyed then the secure element PIN may not be recovered even if the user entered PIN is known. For example, a user who has lost the mobile device and cannot wipe the secure element directly can still access the cloud to destroy the online PIN component to render the secure element unusable.

Improved security may be provided by the specification of a derivation function for combining the user-entered PIN and the key splits. The policies and processes for distributing the PIN splits may also significantly improve security of the secure element PIN.

The inventive functionality of the invention will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

Figure 1:
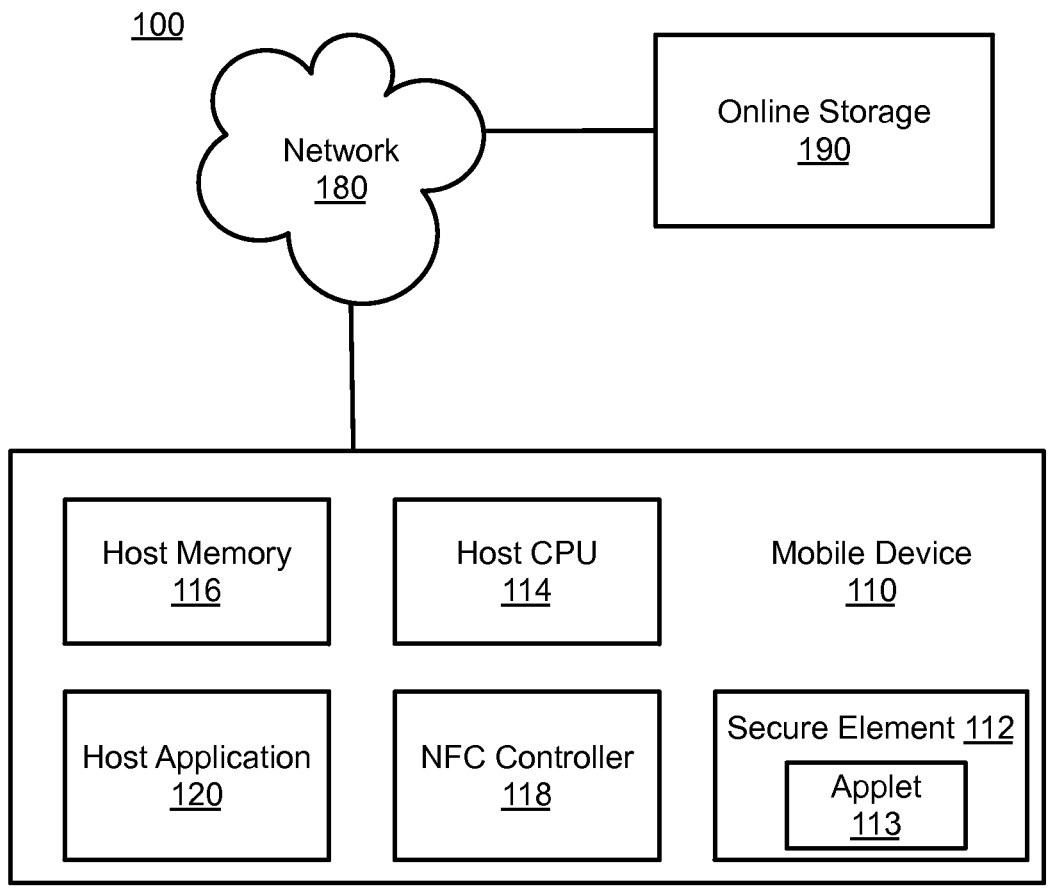
FIG. 1 is a block diagram depicting a mobile transaction system with an enhanced secure element PIN, in accordance with one or more embodiments presented herein.

FIG. 1 is a block diagram depicting a mobile transaction system 100 with an enhanced secure element PIN in accordance with one or more embodiments presented herein. The mobile transaction system 100 can include a mobile device 110. The mobile device 110 can comprise a host CPU 114 and a host memory 116. The mobile device 110 can communicate with online storage 190 via a network 180. The mobile device 110 can execute a host application 120 upon the host CPU 114. The mobile device may also include a secure element 112. In another example embodiment, the mobile device includes a secure memory. An applet 113 or application can execute in association with the secure element 112 to process transactions. An NFC controller 118 associated with the mobile device 110 may be used to process wireless NFC transactions.

The mobile device 110 may be a mobile phone, smartphone, handheld computer, personal digital assistant (PDA), netbook computer, laptop computer, tablet computer, or any other wired or wireless, processor-driven device described herein as a computing machine. The mobile device 110 may include the secure element 112. The NFC controller 118 and an NFC antenna (not shown) can enable the mobile device 110 to communicate with other NFC-enabled devices (not shown). In another example embodiment, a Wi-Fi controller, Bluetooth link controller, or other controller used for communication via radio frequency (RF) associated with the mobile device 110 along with a corresponding antenna are used to communicate with other devices. For example, the mobile device 110 can communicate with NFC-enabled merchant point of sale (POS) devices, ticketing devices, security devices, and other mobile devices 110.

The host CPU 114 can execute host applications 120 stored on the mobile device 110. For example, the host CPU 114 may execute host application 120 that interact with the secure element 112, such as NFC payment applications that enable the user operating the mobile device 110 to complete purchases via an NFC-enabled POS or a transit or event ticketing application that enables the user to enter a transit facility or event via an NFC-enabled ticketing POS. Other host applications 120, including identification, authentication, security, and coupon clipping and redemption applications may also be stored on the mobile device 110 for execution by the host CPU 114. The host applications 120 associated with the mobile device 110 may be stored within, or execute from, the host memory 116 of the mobile device 110. The host memory 116 may be used to store other data or information associated with the mobile device 110. The host memory 116 may include volatile memories, nonvolatile memories, or a combination of both.

The applets 113 may be stored and executed within the secure element 112 of the mobile device 110 for security purposes. The secure element 112 or secure memory can provide a secure operating environment for the applets 113. The secure element 112 may include its own operating environment with one or more tamper-proof microprocessors, an operating system, and memory for storing information, such as payment credentials. The secure element 112 may exist within a fixed chip of the mobile device 110, a Subscriber Identification Module (SIM) card, a Universal Integrated Circuit Card (UICC), a removable smart chip, or in a memory card, such as a microSD card. The secure element 112 also may include a memory controller for managing Read Only Memory (ROM), Ready Access Memory (RAM), and EEPROM flash memory of the card or chip in which the secure element 112 is installed.

The host application 120 can provide enhanced PIN functions for use of the secure element 112 and associated applets 113. The host application 120 can store components of the PIN associated with the secure element 112 in various diverse or distinct locations as discussed herein. The diversity of these storage locations can increase the security of the PIN. These diverse locations may include the host memory 116, the online storage 190, hardware tokens, or various other locations. The online storage 190 may include cloud storage or various network-attached storage. The online storage 190 may also include online services for electronic mail, social networking, instant messaging, or any other online service including an online service specific to storing key splits or PIN splits.

Figure 6:
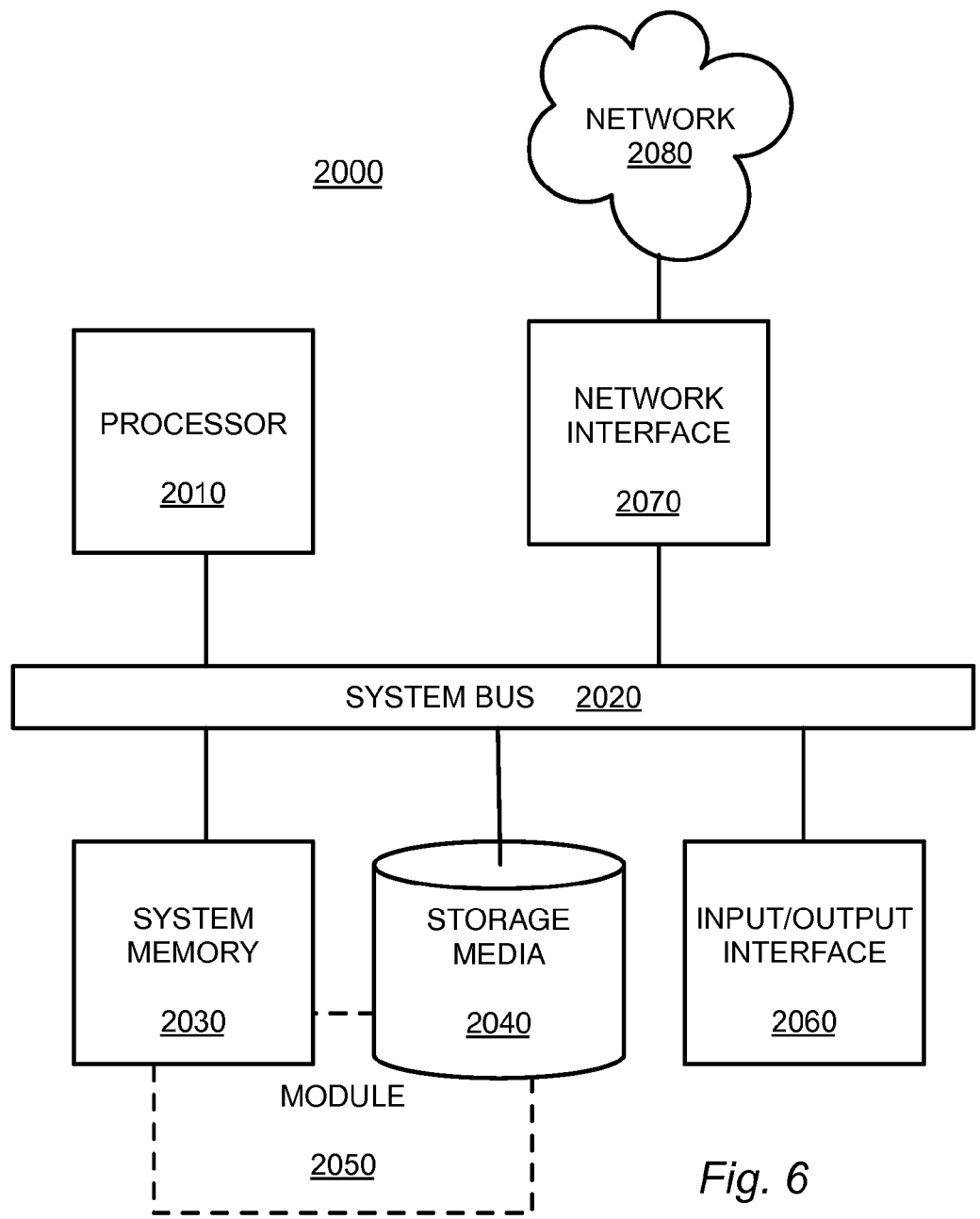
FIG. 6 is a block diagram depicting a computing machine and a module, in accordance with one or more embodiments presented herein.

It should be appreciated that the mobile device 110, the online storage 190, and other computing machines associated with this technology may be any type of computing machine such as, but not limited to, those discussed in more detail with respect to FIG. 6. Furthermore, any modules associated with any of these computing machines or any other modules (software, firmware, or hardware) associated with the technology presented herein may by any of the modules discussed in more detail with respect to FIG. 6. The computing machines discussed herein may communicate with one another as well as other computer machines or communication systems over one or more networks such as network 180. The network 180 may include any type of data or communications network including any of the network technology discussed with respect to FIG. 6.

The components of the example operating environment 100 are described hereinafter with reference to the example methods illustrated in FIGS. 2-5. The example methods of FIGS. 3-5 may also be performed with other systems and in other environments.

Figure 2:
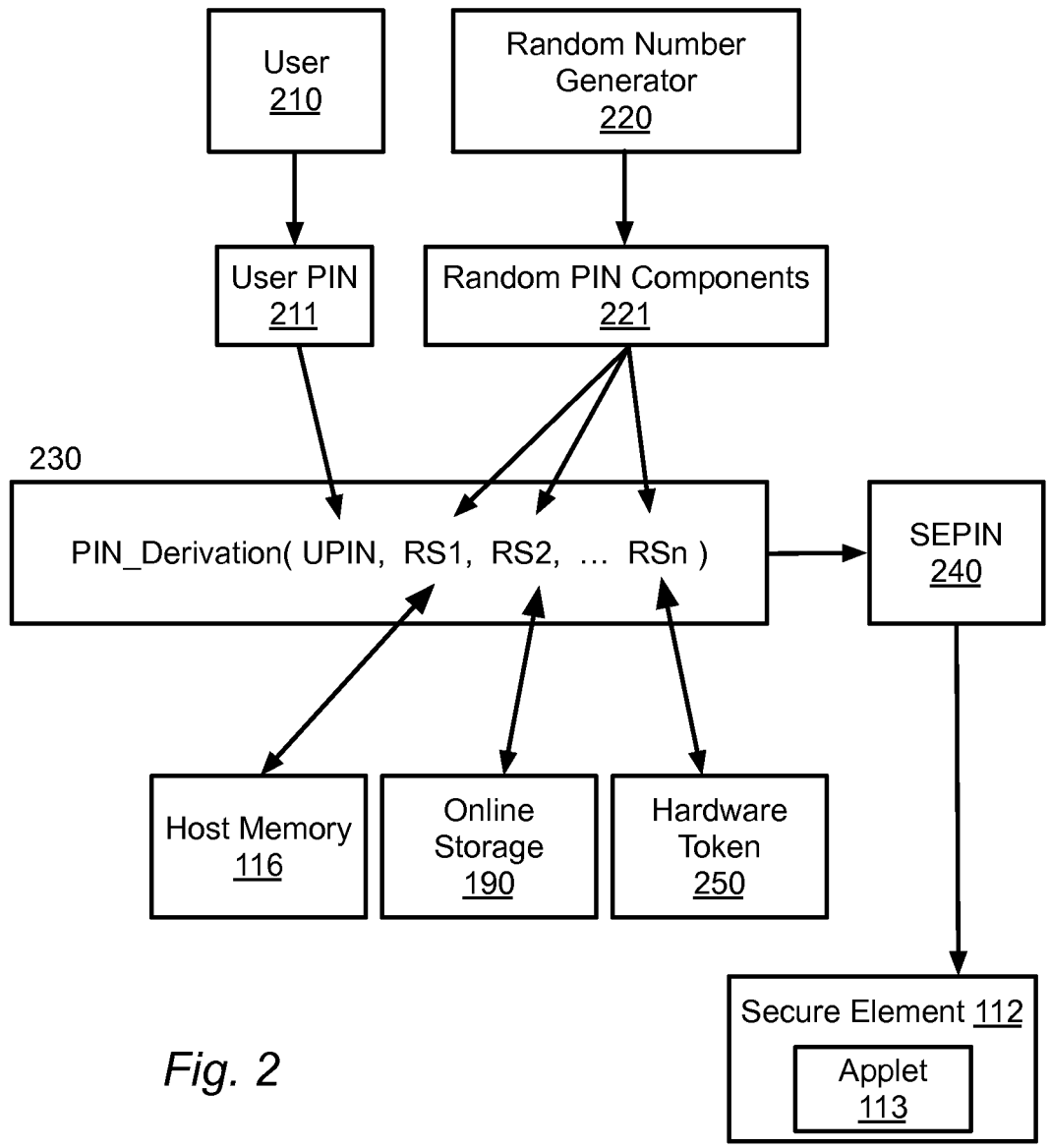
FIG. 2 is a block diagram depicting PIN generation, storage, and reconstruction for secure PIN functionality, in accordance with one or more embodiments presented herein.

FIG. 2 is a block diagram depicting PIN generation, storage, and reconstruction for secure PIN functionality in accordance with one or more embodiments presented herein. A host application 120 executing on the host CPU 114 can receive a user PIN 211 (illustrated as UPIN) from a user 210. The user PIN 211 can be combined with one or more random PIN components 221 using a PIN derivation function 230 (illustrated as "PIN_Derivation( )") to generate a secure element PIN 240 (SEPIN). Accordingly, the SEPIN 240 is a function of the user PIN 211 from the user 210 and one or more random PIN components 221 where the function is specified by the PIN derivation function 230.

To initially configure secure operation of the secure element 112, a random number generator 220 may initially provide the random PIN components 221 to form the SEPIN 240. Each of the random PIN components 221 may be stored in various diverse locations for increased security of the SEPIN 240. These diverse locations may include the host memory 116, the online storage 190, a hardware token 250, or various other locations. For future access to the secure element 112, the user 210 must provide the user PIN 211, each of the random PIN components 221 must be retrieved from their various diverse locations, and the PIN derivation function 230 must be applied to reconstruct the SEPIN 240. Only when the user PIN 211 and each of the random PIN components 221 are correct will the correct SEPIN 240 be generated to grant access to the secure element 112.

The PIN derivation function 230 is a function for generating the SEPIN 240 from an input of the user PIN 211 from the user 210 and one or more random PIN components 221. The PIN derivation function 230 may thus be specified generically as illustrated:

$$SEPIN=PIN\_Derivation(UPIN,RS1,RS2,\ldots,RSn)$$

where RS1-RSn are the random shares or random PIN components 221. The PIN derivation function 230 may be viewed as providing two features or as having two stages. The PIN derivation function 230 may be capable of a combining functionality where the user PIN 211 and the random PIN components 221 are combined in some way. The PIN derivation function 230 may also be capable of a numerical space reducing functionality.

The combining functionality of the PIN derivation function 230 may be provided by any technique to combine the n+1 inputs (the user PIN 211 and the random PIN components 221). An example of combination may involve concatenating the n+1 inputs. More sophisticated techniques may comprise cryptographic hash functions or exclusive-or operations (XOR). According to some example embodiments, a combining function (CF) may be given as:

$$CF(UPIN,RS1,RS2,\ldots,RSn)=SHA1(UPIN\|RS1\|RS2\|\ldots\|RSn)$$

where $\|$ denotes a concatenation operator, SHA1 is the cryptographic hash algorithm defined by NIST FIPS 140, and RS1-RSn are again the random shares or random PIN components 221. The CF may be used for the combining functionality, which may be part of, or a phase of, the PIN derivation function 230. According to other example embodiments, a CF may be given as:

$$CF(UPIN,RS1,RS2,\ldots,RSn)=UPIN\oplus RS1\oplus RS2\oplus\ldots\oplus RSn$$

where $\oplus$ denotes exclusive-or, and RS1-RSn are again the random shares or random PIN components 221. Various other combining techniques may be employed aside from these examples. The CF portion of the PIN derivation function 230 may seek to create a uniform distribution over the range of output values. The PIN derivation function 230 may also seek to increase the entropy of the SEPIN 240.

The numerical space reduction functionality of the PIN derivation function 230 can reduce the output from the CF into a usable SEPIN 240 by reducing the range of outputs of the CF to match the numerical space of acceptable SEPINs 240. For example, the raw output of the SHA1 operation may be 20 arbitrary bytes, however VISA may define a PIN as being only 4-12 digits. As such the raw output of the CF (SHA1 in the this example) may not be directly usable as an SEPIN 240. The raw CF output may be mapped into the valid PIN space. An ideal function for this mapping can preserve a uniform distribution across possible PINS such that roughly same number of raw-outputs map to each possible PIN accepted by the secure element 112. While this may not be mathematically feasible if the range is not an exact multiple of the PIN space, it can be approximated using modulo reduction.

Compatibility with existing applet 113 interfaces for SEPINs 240 may be maintained. The PIN splitting techniques presented herein do not require modification of the secure element applets 113 or PIN format. The complexity of how the SEPIN 240 is generated and how many different split storage locations are involved may be hidden while conforming to the interface expected by each secure element applet 113.

The PIN splitting techniques presented herein may be transparent to the user 210. The user 210 may enter their own choice of user PIN 211 while the host application 120 transforms this into the effective SEPIN 240 before submitting it to the applet 113.

The random number generator 220 can provide each of the random PIN components 221, which may also be referred to as random splits, random shares, key splits, key shares, key components, secret splits, secret shares, secret components, PIN splits, PIN shares, PIN components, or other similar terms. The random number generator 220 may also be a pseudo random number generator. The generated values from the random number generator 220 may be random, pseudo random, noisy, stochastic, or so forth. The values may be calculated or generated within the mobile device 110 or they may be provided at manufacture time, online, or as part of an update, configuration, or firmware image. The random number generator 220 may be seeded from serial numbers, phone numbers, times, dates, geographical locations, and so forth. One or more of the random PIN components 221 may also be derived from unique identifiers of the hardware, such as serial numbers, an IMEI of the mobile device 110 or its phone number. As long as the host application 120 has access to all of the random PIN components 221 and the user PIN 211, the SEPIN 240 may be reconstructed.

The random PIN components 221 may be stored in various diverse locations. For example, one component may be stored on the host memory 116 while another is escrowed to a cloud service, or otherwise stored to online storage 190. User credentials may also be required to authenticate access to the cloud service, online service, or online storage 190. A hardware token 250 such as a SIM, radio device, user token, or so forth may also be used to store one or more of the random PIN components 221. When the hardware token 250 is separated from the mobile device 110, the respective PIN component will not be retrievable and the secure element 112 may be rendered inoperable.

The PIN splitting techniques presented herein can support automatic PIN revocation based on event triggers. When one of the shares is stored on the host memory 116, it is automatically cleared on certain events, such as factory resetting the mobile device 110 or unlocking the boot-loader. This can improve security against attackers that attempt to send PIN guesses directly to the secure element 112 after capturing the mobile device 110. Normally factory reset and unlocking the boot-loader do not perturb the state of the secure element 112 which may allow an attacker to install a different operating system to gain direct access to the secure element 112 and target an existing applet 113. Such attacks are thwarted when the SEPIN 240 depends on a share that was stored on the host file-system within the host memory 116 which was deleted during the unlock or reset process.

The PIN splitting techniques presented herein can revoke PIN where a split is stored in an online storage 190 such as cloud storage or a cloud service. The PIN can be revoked by declining retrieval of the share from the online storage 190 when requested by the mobile device 110. This can also tie usage to an external identity where the online storage 190 will only reveal its PIN share if the user 210 can authenticate to the cloud-service associated with the online storage 190.

The PIN splitting techniques presented herein can improve privacy for cloud PIN shares. The user's choice for the user PIN 211 may be hidden from a cloud service provider associated with the online storage 190. Instead of storing the true value of the SEPIN 240 or the user PIN 211 within the cloud, only one share is stored in the cloud, with one or more other shares kept on the mobile device 110 or elsewhere.

The PIN splitting techniques presented herein can restrict the interface for PIN submissions from the user 210. Some applets 113 on the secure element 112 may accept communications both from the mobile device 110 as well as over-the-air from NFC antenna. By having a PIN share reside on the host memory 116 and PIN reconstruction processed by the host application 120, attempts to enter the PIN on an external PIN pads that communicate directly with the secure element 112 can be ruled out. Even if the user is tricked into entering their PIN on an external keypad, it would not be possible to activate payments because of the missing PIN shares. This can force PIN entry to take place via the trusted user interface at the mobile device 110.

The PIN splitting techniques presented herein can provide an audit trail for PIN usage. When one of the PIN shares is stored at a cloud service or other online storage 190, each access to online PIN share to reconstruct the SEPIN 240 can generate an entry to an audit trail or journal. This can be useful to monitor for unauthorized access or provide history of actions that are otherwise taking place on the mobile device 110.

Example System Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 3:
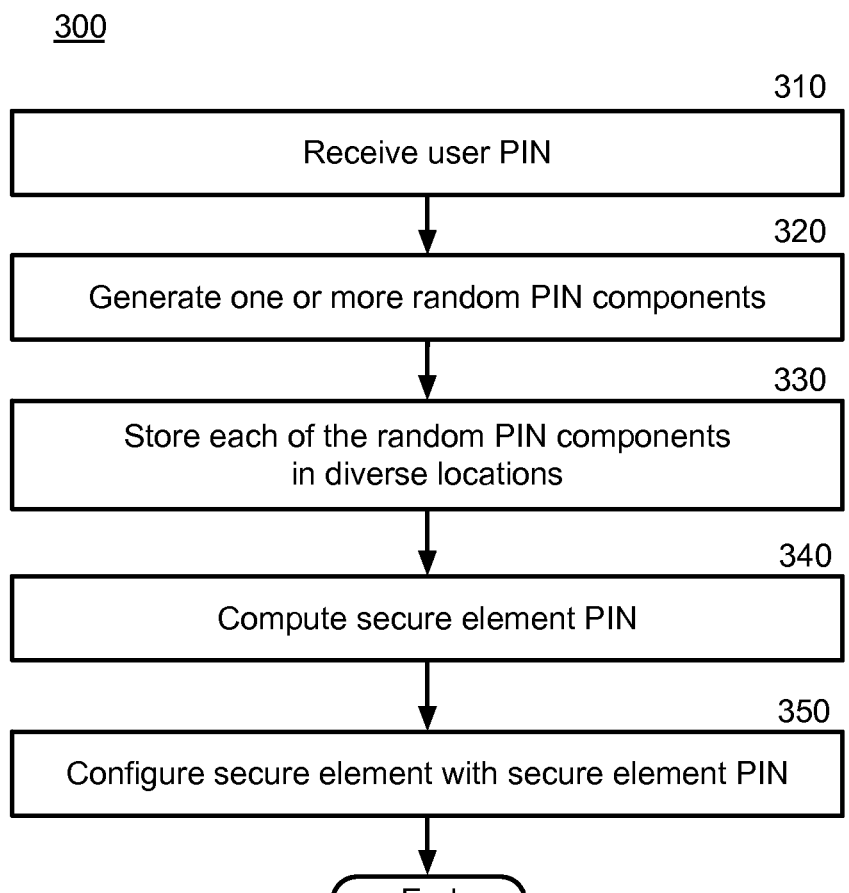
FIG. 3 is a block flow diagram depicting a method for splitting and storing PINs to configure a secure element PIN, in accordance with one or more embodiments presented herein.

FIG. 3 is a block flow diagram depicting a method for splitting and storing PINs to configure a secure element PIN in accordance with one or more embodiments presented herein.

In block 310, the host application 120 can receive a user PIN 211 from the user 210. While users generally pick relatively predictable PINs or reuse PINs that they use for other functions, the PIN splitting techniques presented herein may improve the security of any user PIN 211. The user 210 may enter their own choice of user PIN 211 and the host application 120 can transform it into an effective SEPIN 240 before submitting it to an applet 113 in the secure element 112. In an example embodiment, the user PIN 211 comprises a combination of a predefined number of digits. For example, the host application 120 requests the user 101 to choose and enter a user PIN 211 consisting of four digits and the user 101 selects and enters "1234". In another example embodiment, there is no predefined length of the user PIN 211. For example, the user 101 can select "1234" or "67890" as the user PIN 211. In yet another example embodiment, instead of a predefined length there is a predefined range of lengths for the user PIN 211. For example, the host application 120 requests the user 101 to choose and enter a user PIN 211 that consists of between four and twelve digits.

In block 320, the host application 120 can generate one or more random PIN components 221. To initially configure secure operation of the secure element 112, the random number generator 220 can provide each of the random PIN components 221. The generated values from the random number generator 220 may be random, pseudo random, noisy, stochastic, or so forth. The values may be calculated or generated within the mobile device 110 or they may be provided at manufacture time, online, or as part of an update, configuration, or firmware image. The random number generator 220 may be seeded from serial numbers, phone numbers, times, dates, geographical locations, and so forth. One or more of the random PIN components 221 may also be derived from unique identifiers of the hardware, such as serial numbers, an IMEI of the mobile device 110 or its phone number.

In block 330, the host application 120 can store each of the random PIN components 221 in diverse locations. For example, one component may be stored on the host memory 116 while another is escrowed to a cloud service, or otherwise stored to online storage 190. User credentials may also be required to authenticate access to the cloud service, online service, or online storage 190. A hardware token 250 such as a SIM, radio frequency (RF) device, user token, or so forth may also be used to store one or more of the random PIN components 221. For example, the mobile device has network 180 access to a user's 101 online cloud storage 190 as well as to an NFC-enabled user device comprising a data storage unit at the time the mobile device 110 begins storage of random PIN components 221. Continuing with the same example, the host application 120 stores one random PIN component 221 on a cloud storage, one random PIN number 221 on the data storage unit of the NFC-enabled user device, and the remaining random PIN components 221 on the host memory 116 of the mobile device 110. In yet another example embodiment, one or more of the one or more random PIN components 221 are stored on a data storage unit on the user device (or mobile device 110) of a second user 101. For example, the user PIN 211 is associated with a secure element 112 financial application 113 on a first user's 101 mobile device 110 for a joint financial account with a second user 101. Continuing with the same example, the second user's 101 mobile device 110 receives one or more of the one or more random PIN components so that the second user's 101 presence is required for the first user 101 to access the secure element application on the first user's mobile device.

In block 340, the host application 120 can compute the SEPIN 240 using the PIN derivation function 230. The PIN derivation function 230 is a function for generating the SEPIN 240 from an input of the user PIN 211 from the user 210 and one or more random PIN components 221. In an example embodiment, the SEPIN 240 is based at least in part on the user PIN 211 and the stored one or more random PIN components 221. The PIN derivation function 230 may be viewed as providing two features or as having two stages. The first stage of the PIN derivation function 230 may be capable of a combining functionality where the user PIN 211 and the random PIN components 221 are combined in some way. The second stage of the PIN derivation function 230 may provide a numerical space reducing functionality.

In block 350, the host application 120 can configure the secure element 112 with the SEPIN 240 computed in block 340. The SEPIN 240 may generally be considerably more secure than a user-entered user PIN 211. In an example embodiment, the host application transmits a request, comprising the SEPIN, to the secure element (or the secure element application) of the mobile device to configure the secure element with the SEPIN.

After block 350, the method 300 ends. Of course, splitting and storing PINS to configure a secure element PIN may be continued through repeated application of method 300.

Figure 4:
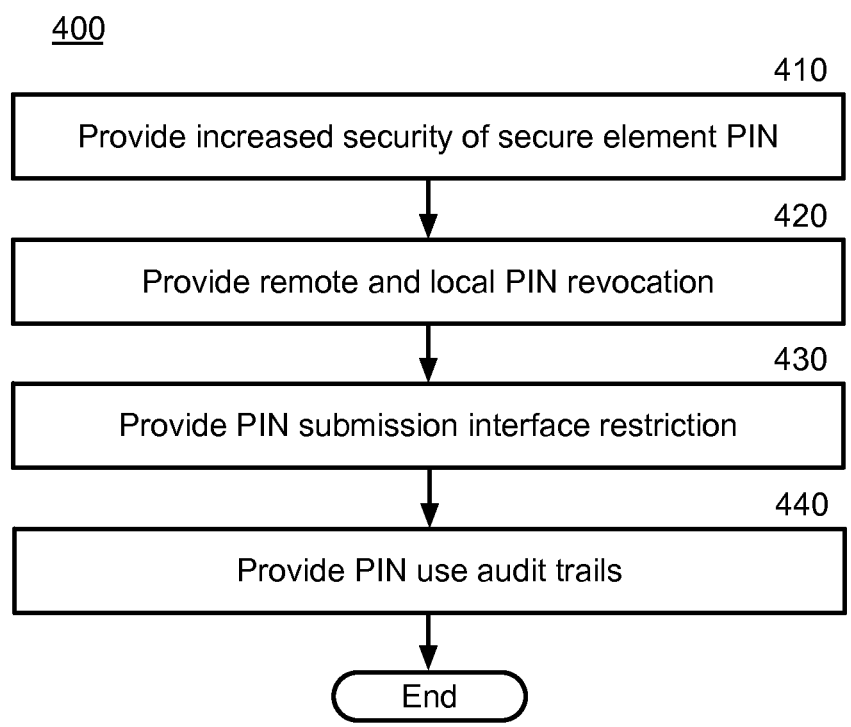
FIG. 4 is a block flow diagram depicting a method for functionality provided by splitting and storing PINs, in accordance with one or more embodiments presented herein.

FIG. 4 is a block flow diagram depicting a method 400 for functionality provided by splitting and storing PINS in accordance with one or more embodiments presented herein. The blocks illustrating such functionality here are not meant to indicate any specific order of operation.

In block 410, the host application 120 can provide increased security for the SEPIN 240. The PIN derivation function 230 may seek increase the entropy of the SEPIN 240 and may also create a uniform distribution over the range of output values.

In block 420, the host application 120 can provide remote and local PIN revocation. For an example of local PIN revocation, when one of the random PIN components 221 is stored on the host memory 116, it may be automatically cleared upon certain events. Examples of these events may include factory resetting the mobile device 110 or unlocking the boot-loader. This can improve security against attackers that attempt to send PIN guesses directly to the secure element 112 after physically capturing the mobile device 110. Normally factory reset and unlocking the boot-loader do not clear the state of the secure element 112 which may allow an attacker to install a different operating system to gain direct access to the secure element 112 and target an existing applet 113. Such attacks are thwarted when the SEPIN 240 depends on a share that was stored on the host file-system within the host memory 116 which was deleted during the unlock or reset process.

As an example of remote PIN revocation, one of the random PIN components 221 that are stored in an online storage 190 may be destroyed or denied. This may be done remotely even when the user 210 does not have physical possession of the mobile device 110, for example after loss or theft of the mobile device 110.

In block 430, the host application 120 can provide PIN submission interface restriction. By storing one of the random PIN components 221 on the host memory 116 and performing PIN reconstruction through the host application 120, attempting to enter the PIN on an external PIN pads that communicate directly with the secure element 112 can be ruled out. This can force PIN entry to take place via the trusted user interface at the mobile device 110.

In block 440, the host application 120 can provide PIN use audit trails. For example, when one of the random PIN components 221 is stored at a cloud service or other online storage 190, each access to online PIN share to reconstruct the SEPIN 240 can generate an entry to an audit trail or journal. In an example embodiment, the audit trail comprises geographical information at the time the user 101 access the secure element 112 and other useful information. For example, an audit trail can be useful to monitor for unauthorized access or provide history of actions that are otherwise taking place on the mobile device 110. Continuing with the same example, a history of unauthorized access, or a certain number of repeat failed attempts to access the secure element 112, or an access in a prohibited location triggers deletion of one or more random PIN components 221.

Figure 5:
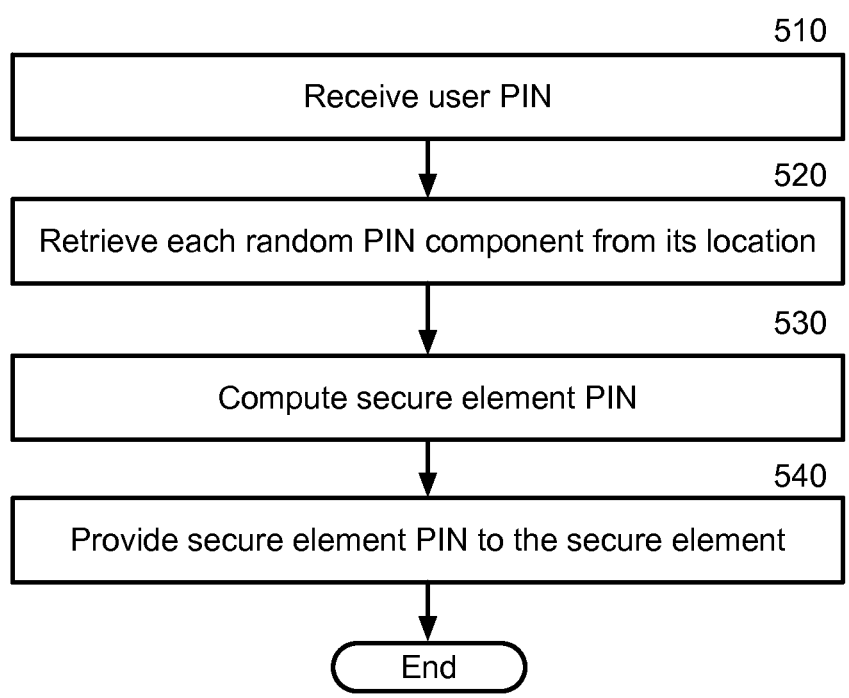
FIG. 5 is a block flow diagram depicting a method for reconstructing a secure element PIN, in accordance with one or more embodiments presented herein.

FIG. 5 is a block flow diagram depicting a method 500 for reconstructing a secure element PIN in accordance with one or more embodiments presented herein.

In block 510, the host application 120 can receive a user PIN 211 from the user 210. The user 210 can input the user PIN 211 without knowing the SEPIN 240 and the host application 120 can attempt to regenerate the SEPIN 240 without further interaction from the user 210. In an example embodiment, the user 101 enters the user PIN 211 using the user interface on the mobile device 110.

In block 520, the host application 120 can retrieve each random PIN component 221 from its respective location. These locations are those used to store the random PIN components 221 in block 330.

In block 530, the host application 120 can compute an SEPIN 240 using the PIN derivation function 230. The PIN derivation function 230 can generate the SEPIN 240 from an input of the user PIN 211 from the user 210 and one or more retrieved PIN components 221 in the same fashion as the SEPIN 240 was computed in block 340.

In block 540, the host application 120 can provide the SEPIN 240 computed in block 430 to the secure element 112. For access to the secure element 112, the user 210 must provide the correct user PIN 211, each of the random PIN components 221 must be correctly retrieved from their various diverse locations, and the PIN derivation function 230 must be applied to reconstruct the SEPIN 240. Only once the user PIN 211 and each of the random PIN components 221 are correct will the correct SEPIN 240 be generated to grant access to the secure element 112. As such, each of the random PIN components 221 must be retrieved from their respective diverse locations in order to reconstruct the SEPIN 240 whenever performing a transaction using the SE.

After block 540, the method 500 ends. Of course, reconstruction of the SEPIN 240 may be continued through repeated application of method 500.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to secure personal identification numbers, comprising:

receiving, by a mobile computing device, an input of a first user personal identification number (PIN) for a secure memory associated with the mobile computing device;

generating, by the mobile computing device, two or more random PIN components, wherein the two or more random PIN components are stored at various diverse locations;

storing, by the mobile computing device, at least one of the two or more generated random PIN components in a respective distinct location, wherein the respective distinct location comprises a host memory of the mobile computing device;

storing, at a second computing device, at least another one of the two or more generated random PIN components, the at least another one generated random PIN component is accessible and deletable through a network by the mobile computing device;

generating, by the second computing device, a use audit trail entry, wherein the audit trail entry comprises a catalogue of recorded attempts to access or delete the at least another one generated random PIN component stored at the second computing device;

determining, by the mobile computing device, a first secure memory PIN based at least in part on the first user PIN and the two or more generated random PIN components;

configuring, by the mobile computing device, the secure memory associated with the mobile computing device using the determined first secure memory PIN;

receiving, by the mobile computing device, an input of a second user PIN in association with a request to access the secure memory associated with the mobile computing device;

retrieving, by the mobile computing device, the two or more generated random PIN components from the various diverse locations where the two or more generated random PIN components were stored;

determining, by the mobile computing device, a second secure memory PIN based at least in part on the second user PIN and the two or more retrieved random PIN components;

determining, by the mobile computing device, that the determined first secure memory PIN and the determined second secure memory PIN match; and providing, by the mobile computing device, access to the secure memory in response to determining that the determined first secure memory PIN and the determined second secure memory PIN match.

2. The computer-implemented method of claim 1, wherein one or more of the two or more random PIN components is generated by a random number generator.

3. The computer-implemented method of claim 1, wherein the determining the first secure memory PIN further comprises increasing entropy over the first and second user PINs.

4. The computer-implemented method of claim 1, wherein the determining the first secure memory PIN further comprises applying a numerical space reduction functionality, wherein the numerical space reduction functionality reduces a range of outputs of a derivation to match the numerical space allowance for an acceptable first secure memory PIN.

5. The computer-implemented method of claim 1, further comprising, in response to a factory reset of the mobile computing device, deleting, by the mobile computing device, one or more of the two or more random PIN components stored by the mobile computing device.

6. The computer-implemented method of claim 1, wherein if the input of the second user PIN is not received from a user of the mobile computing device, the mobile computing device denies access to the secure memory.

7. A computer program product, comprising: a non-transitory computer-readable medium having computer-executable program instructions embodied thereon that when executed by a computing device cause the computing device to secure personal identification numbers, the computer-executable program instructions comprising:
computer-executable program instructions to generate two or more random PIN components, wherein the two or more random PIN components are stored at various diverse locations;
computer-executable program instructions to store, at least one of the two or more generated random PIN components in a respective distinct location, wherein the respective distinct location comprises a host memory of the computing device;
computer-executable program instructions to store, at a second computing device, at least another one of the two or more generated random PIN components, the at least another one generated random PIN component is accessible and deletable through a network by the computing device;
computer-executable program instructions to access or delete the at least another one generated random PIN component stored at the second computing device, wherein the second computing device, uses an audit trail entry, wherein the audit trail entry comprises a catalogue of recorded attempts to access or delete the at least another one generated random PIN component stored at the second computing device;
computer-executable program instructions to determine a first secure memory PIN based at least in part on a first user PIN and the two or more random PIN components;
computer-executable program instructions to configure a secure memory of the computing device using the determined first secure memory PIN;
computer-executable program instructions to receive a second user PIN in association with a request to access the secure memory;
computer-executable program instructions to retrieve the at least one of the two or more random PIN components stored at the respective distinct location;
computer-executable program instructions to determine a second secure memory PIN based at least in part on the second user PIN and the at least one retrieved random PIN component;
computer-executable program instructions to compare the determined first secure memory PIN and the determined second secure memory PIN; and
computer-executable program instructions to provide access to the secure memory of the computing device, wherein the access is provided based at least in part on the comparison of the determined first secure memory PIN and the determined second secure memory PIN.

8. The computer program product of claim 7, further comprising computer-executable program instructions to receive the first and second user PINs.

9. The computer program product of claim 8, wherein if the second user PIN is not received from a user of computing device, the computing device denies access to the secure memory.

10. The computer program product of claim 7, further comprising, in response to receiving a factory reset, computer-executable program instructions to delete one or more of the two or more random PIN components.

11. The computer program product of claim 7, wherein one or more of the two or more random PIN components is generated by a random number generator.

12. The computer program product of claim 7, wherein determining the first secure memory PIN further comprises increasing entropy over the first and second user PINs.

13. The computer program product of claim 7, wherein determining the first secure memory PIN further comprises applying a numerical space reduction functionality, wherein the numerical space reduction functionality reduces a range of outputs of a derivation function to match the numerical space allowance for an acceptable first secure memory PIN.

14. The computer program product of claim 7, wherein if the input of the second user PIN is not received from a user of the computing device, the computing device denies access to the secure memory.

15. A system for securing personal identification numbers, comprising:
a non-transitory storage medium; and
a processor communicatively coupled to the non-transitory storage medium, wherein the processor executes application code instructions that are stored in the non-transitory storage medium to cause the system to:
generate two or more random personal identification number (PIN) components;
store each of the two or more random PIN components in various locations, wherein at least one of the two or more generated random PIN components is stored at a respectively distinct location, and at least another one of the two or more generated random PIN components is stored at a computing device that is remote from the respective distinct location, and the at least another one generated random PIN component is accessible and deletable through a network;
access or delete the at least another one generated random PIN component stored at the computing device, wherein the computing device comprises a catalogue of recorded attempts to access or delete the at least another one generated random PIN component stored at the computing device;
determine a first secure memory PIN based at least in part on a first user PIN and the two or more random PIN components;

configure a secure memory using the determined first secure memory PIN;
receive a second user PIN in association with a request to access the secure memory;
retrieve the two or more random PIN components from the various locations where the two or more generated random PIN components were stored;
determine a second secure memory PIN based at least in part on the second user PIN and the two or more retrieved random PIN components;
compare the determined first secure memory PIN and the determined second secure memory PIN; and
provide access to the secure memory, wherein the access is provided based at least in part on the comparison of the determined first secure memory PIN and the determined second secure memory PIN.

16. The system of claim 15, wherein the respective distinct location comprises a host memory.

17. The system of claim 15, wherein one or more of the two or more random PIN components is generated by a random number generator.

18. The system of claim 15, wherein determining the first secure memory PIN further comprises increasing entropy over the first and second user PINs.

19. The system of claim 15, wherein determining the first secure memory PIN further comprises applying a numerical space reduction functionality, wherein the numerical space reduction functionality reduces a range of outputs of a derivation function to match the numerical space allowance for an acceptable first secure memory PIN.

20. The system of claim 15, wherein if the input of the second user PIN is not received from a user of the computing device, the computing device denies access to the secure memory.

* * * * *